(12) United States Patent
Smith

(10) Patent No.: US 8,760,340 B2
(45) Date of Patent: Jun. 24, 2014

(54) PROCESSING RADAR RETURN SIGNALS TO DETECT TARGETS

(75) Inventor: Winthrop W. Smith, Richardson, TX (US)

(73) Assignee: Raytheon Company, Waltham, MA (US)

( * ) Notice: Subject to any disclaimer, the term of this patent is extended or adjusted under 35 U.S.C. 154(b) by 260 days.

(21) Appl. No.: 12/832,132

(22) Filed: Jul. 8, 2010

(65) Prior Publication Data

US 2012/0007773 A1 Jan. 12, 2012

(51) Int. Cl.
*G01S 13/00* (2006.01)
*G01S 13/524* (2006.01)
*G01S 7/292* (2006.01)

(52) U.S. Cl.
CPC ............ *G01S 7/292* (2013.01); *G01S 13/524* (2013.01)
USPC ........... 342/107; 342/110; 342/114; 342/149

(58) Field of Classification Search
USPC ................................. 342/107, 110, 114, 149
See application file for complete search history.

(56) References Cited

U.S. PATENT DOCUMENTS

| | | | |
|---|---|---|---|
| 4,471,357 A * | 9/1984 | Wu et al. ...................... | 342/25 D |
| 5,113,194 A * | 5/1992 | Krikorian et al. ............. | 342/106 |
| 5,532,699 A | 7/1996 | Smith | |
| 5,552,792 A | 9/1996 | Smith | |
| 5,784,026 A * | 7/1998 | Smith et al. ................... | 342/160 |
| 6,161,076 A * | 12/2000 | Barr et al. ....................... | 702/17 |
| 6,192,322 B1 * | 2/2001 | Rafanelli et al. .............. | 702/150 |
| 2010/0245152 A1* | 9/2010 | Krikorian et al. ............... | 342/28 |

FOREIGN PATENT DOCUMENTS

| | | |
|---|---|---|
| EP | 0 472 974 A2 | 3/1992 |
| WO | WO 2008/093036 A2 | 8/2008 |

OTHER PUBLICATIONS

PCT Notification of Transmittal of the Intl. Search Report and the Written Opinion of the Intl. Searching Authority, or the Declaration mailed Sep. 12, 2011, regarding Intl. Appln. No. PCT/US2011/042743 filed Jul. 7, 2011.

* cited by examiner

*Primary Examiner* — Timothy A Brainard
(74) *Attorney, Agent, or Firm* — Burns & Levinson LLP; Joseph M. Maraia

(57) ABSTRACT

In certain embodiments, an apparatus comprises range matched filters and a Doppler-acceleration matched filter system. The matched filters are configured to receive radar return signals detected by an antenna and range match filter the radar return signals to place the radar return signals into range cells. The Doppler-acceleration matched filter system is configured to Doppler-acceleration process the radar return signals in the range cells to facilitate identification of one or more targets.

16 Claims, 4 Drawing Sheets

PROCESSING RADAR RETURN SIGNALS TO DETECT TARGETS

TECHNICAL FIELD

This invention relates generally to the field of radar systems and more specifically to processing radar return signals to detect targets.

BACKGROUND

A radar system sends signals that may be reflected by a target back to the radar system. The radar system typically detects the target by processing data from the return radar signals to separate wanted information from unwanted information. The wanted information generally provides information about the target. The unwanted information may include, for example, backscatter from ground clutter as well as environmental and system noise.

SUMMARY OF THE DISCLOSURE

In accordance with the present invention, disadvantages and problems associated with previous techniques for detecting targets may be reduced or eliminated.

In certain embodiments, an apparatus comprises range matched filters and a Doppler-acceleration matched filter system. The matched filters are configured to receive radar return signals detected by an antenna and range match filter the radar return signals to place the radar return signals into range cells. The Doppler-acceleration matched filter is configured to Doppler-acceleration process the radar return signals in the range cells.

In certain embodiments, the apparatus may also comprise an inverse filter system and/or and an adaptive threshold device. The inverse filter system is configured to azimuth match filter the radar return signals in the range cells to yield filtered radar return signals. The adaptive threshold device is configured to adaptively threshold the filtered radar return signals to identify one or more targets.

In certain embodiments, a method comprises receiving radar return signals detected by an antenna and range match filtering the radar return signals to place the radar return signals into range cells. The radar return signals in the range cells are Doppler-acceleration processed. In certain embodiments, the method may also comprise azimuth match filtering the radar return signals in the range cells. In certain embodiments, the method may also comprise adaptively thresholding the radar return signals to identify one or more targets.

Certain embodiments of the invention may provide one or more technical advantages. A technical advantage of one embodiment may be that Doppler-acceleration matched filters may more effectively separate moving target return from stationary clutter return. Another technical advantage of one embodiment may be that azimuth processing divides radar return data into azimuth cells to slice the azimuth beamwidth. In certain situations, targets are localized in azimuth but clutter is not, so azimuth processing may provide better resolution of targets.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 6 of the drawings, like numerals being used for like and corresponding parts of the various drawings.

Figure 1:
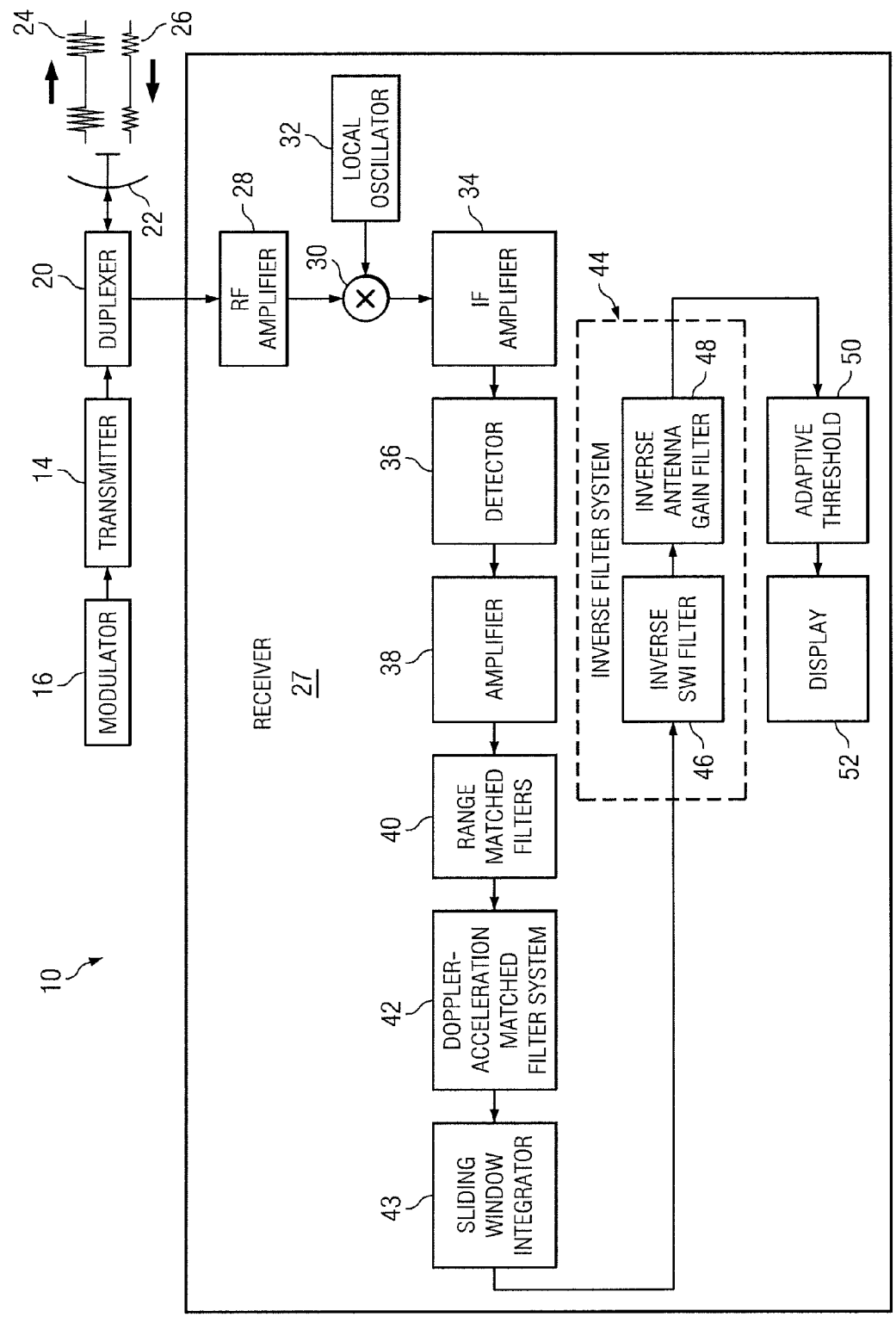
FIG. 1 illustrates an example of a radar system that transmits signals and processes radar return signals.

FIG. 1 illustrates an example of a radar system 10 that transmits signals and processes radar return signals. In certain embodiments, system 10 receives radar return signals and range match filters the signals to place the signals into range cells. Doppler-acceleration matched filters process the radar return signals in the range cells. In certain embodiments, system 10 has azimuth matched filters that filter the radar return signals in the range cells. In certain embodiments, system 10 performs adaptive thresholding on the radar return signals to identify one or more targets.

In general, processing data from return radar signals to separate wanted information from unwanted information may involve any suitable processing. As an example, targets may be localized in range and/or azimuth relative to ground clutter. Accordingly, data may be processed to localize range and/or azimuth data. As another example, targets may be moving, so the return energy of the signals may have a Doppler shift and/or acceleration relative to that of ground clutter. Accordingly, data may be Doppler-acceleration processed to separate targets from clutter.

In the illustrated example, system 10 includes a transmitter 14, a modulator 16, a duplexer 20, an antenna 22, and a receiver 27. Receiver 27 includes a radio frequency (RF) amplifier 28, a mixer 30, a local oscillator 32, an intermediate frequency (IF) amplifier 34, an envelope detector 36, an amplifier 38, range matched filters 40, a Doppler-acceleration matched filter system 42, a sliding window integrator (SWI) 43, an inverse filter system 44 (which includes an inverse SWI filter 46 and an inverse antenna gain filter 48), an adaptive threshold device 50, and a display 52.

In certain embodiments, transmitter 14 generates a signal oscillating at a frequency f. Modulator 16 controls transmitter 14 to repetitively output short duration pulses. Each pulse output from transmitter 14 comprises several cycles of energy at frequency f. Duplexer 20 passes the signal to antenna 22 that radiates the energy of the pulsed signal into free space as a pulsed electromagnetic wave 24.

In certain embodiments, if the radiated pulsed electromagnetic wave 24 strikes and is reflected by an object, a pulsed echo wave 26 of substantially less signal strength is generated. Antenna 22 receives pulsed echo wave 26 to produce radar return signals that are passed by duplexer 20 to receiver 27. Radio frequency (RF) amplifier 28 of receiver 27 amplifies the return signals and sends the return signals to mixer 30.

Mixer 30 mixes the return signals and a signal oscillating at an intermediate frequency $f+f_i$ generated by local oscillator 32.

In certain embodiments, mixer 30 outputs intermediate frequency radar return signals that each comprise a train of pulses. Each pulse comprises oscillations at the intermediate frequency $f+f_i$. The intermediate frequency radar return signals are amplified by intermediate frequency (IF) amplifier 34, rectified and low pass filtered by envelope detector 36, and amplified by amplifier 38.

In certain embodiments, range matched filters 40 perform range match filtering to divide radar return data into range cells that correspond to the range from system 10. The cells may be approximately the size of the target plus the potential target range motion during integration time. The cell size may yield a smaller amount of radar backscatter from clutter in the range cell of the target.

In certain embodiments, Doppler-acceleration matched filter system 42 performs Doppler-acceleration processing, such as Doppler-acceleration matched filtering, for each range cell. In the embodiments, Doppler-acceleration matched filtering filters for a combination of Doppler shift and acceleration. Any suitable Doppler-acceleration matched filter system 42 may be used. Examples of Doppler-acceleration matched filter system 42 are described with reference to FIGS. 3A and 3B and in U.S. Pat. No. 5,784,026 of Smith et al., which is incorporated herein by reference.

In certain embodiments, sliding window integrator (SWI) 43 processes the detected and amplified radar return signals, which may improve the signal-to-noise ratio, and outputs integrated radar return signals.

In certain embodiments, inverse filter system 44 performs azimuth processing by azimuth match filtering to divide radar return data into azimuth cells, which serve to slice the azimuth beamwidth into smaller angular increments. In certain situations, targets are localized in azimuth but clutter is not. Accordingly, slicing the azimuth beamwidth may provide better resolution of targets. In addition, azimuth location may be independently computed, so multiple targets in the same range cell can be detected. In certain embodiments, inverse filters 44 may slice prior to adaptive thresholding.

Any suitable inverse filter system 44 may be used. In certain embodiments, matched filters may be used, which may improve signal-to-noise ratio and provide better azimuth resolution. Examples of inverse filter system 44 are described with reference to FIGS. 4 through 6 and in U.S. Pat. No. 5,532,699 of Smith et al. and U.S. Pat. No. 5,552,792 of Smith et al., which are incorporated herein by reference.

In certain embodiments, adaptive threshold detector 50 determines the strength of the signals and subjects the signals to threshold criteria to identify targets. The criteria may change in response to detected strength. In certain embodiments, display 52 displays an image that represents data resulting from processing the radar return signals. For example, the image may show data that has been range, azimuth, and Doppler-acceleration processed to distinguish targets from ground clutter.

Figure 2:
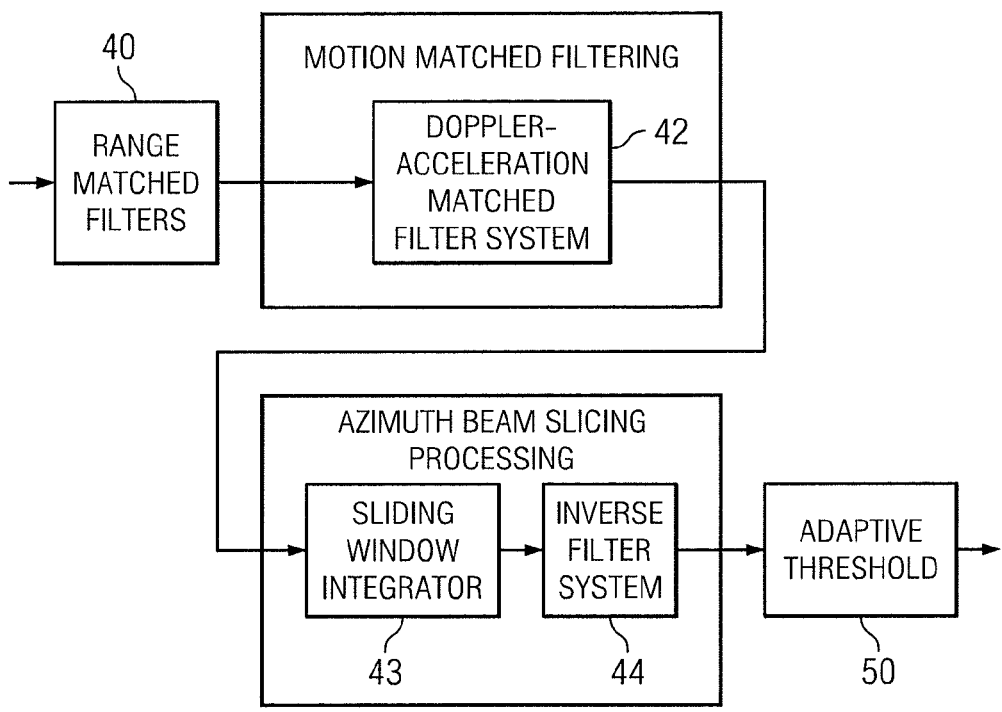
FIG. 2 illustrates an example of a Doppler-acceleration matched filter system and an example of an inverse filter system.

FIG. 2 illustrates an example of Doppler-acceleration matched filter system 42 and an example of inverse filter system 44 that may be used with system 10 of FIG. 1. In certain embodiments, the radar return signals may be Doppler-acceleration processed before azimuth match filtered, and then adaptive thresholded after azimuth match filtered.

In certain embodiments, Doppler-acceleration matched filter system 42 performs Doppler-acceleration processing, such as Doppler-acceleration matched filtering, for each range cell. In the embodiments, Doppler-acceleration matched filtering filters for a combination of Doppler shift and acceleration. In certain situations, ground clutter Doppler shift and acceleration are typically close to zero. Targets moving primarily in cross-range typically have a near-zero Doppler shift, but have acceleration that is outside the bandwidth of the Doppler-acceleration filter where the ground clutter appears. Filtering for a near-zero Doppler shift and this acceleration shows cross-range moving targets, but not ground clutter. Accordingly, the targets may be detected.

In certain situations, targets moving radially towards the radar have a Doppler shift that separates them from ground clutter, for example, a Doppler shift that is outside the bandwidth of the Doppler filter where the ground clutter appears. Filtering for this Doppler shift and near-zero acceleration yields the radially moving targets, but not ground clutter. Accordingly, the targets may be detected.

In certain embodiments, Doppler-acceleration matched filtering may provide advantages over Doppler matched filtering that does not consider acceleration. Both ground clutter and cross-range moving targets typically have a near-zero Doppler shift, so Doppler matched filtering does not distinguish the targets from the clutter.

Inverse filter system 44 divides the azimuth beamwidth into smaller angular increments prior to adaptive thresholding. In the embodiments, inverse filters 44 may slice beam the based on the pulse repetition rate (PRF) and the beam scanning speed in azimuth.

In certain situations, sliding window integration may yield better slicing than monopulse processing. In one example, the following may be used:

δ=azimuth beamwidth in degrees,
α=azimuth scan rate in degrees/second, and
X=number of transmitted pulses after which the sliding window integrator slides.

In the example, the radar transmits PRF/α pulses per degree of azimuth scan, and the sliding window integrator divides the azimuth beamwidth by a factor of (PRF/α)/X.

In certain embodiments, inverse filter system 44 may compensate and/or correct for adverse affects resulting from "filtering" of radar return signals by antenna 22 and sliding window integrator 43. For example, the azimuth beam gain of antenna 22 tapers, so the value of the return from each range-azimuth cell changes as a function of where the cell is in the azimuth beamwidth. Inverse antenna gain filter 48 corrects for this beam shaping so that returns from individual range-azimuth cells are nearly constant, regardless of where that cell is located in the azimuth beam. In certain embodiments, inverse antenna gain filter 48 has a filter response that is substantially an inverse of the azimuth beam gain of antenna 22.

As another example, sliding window integrator 43 has a transfer function that is not rectangular. Inverse SWI filter 46 corrects for the shape of sliding window integrator 43. In certain embodiments, inverse SWI filter 46 has a filter response that is substantially an inverse of a response for sliding window integrator 43.

Figure 3A:
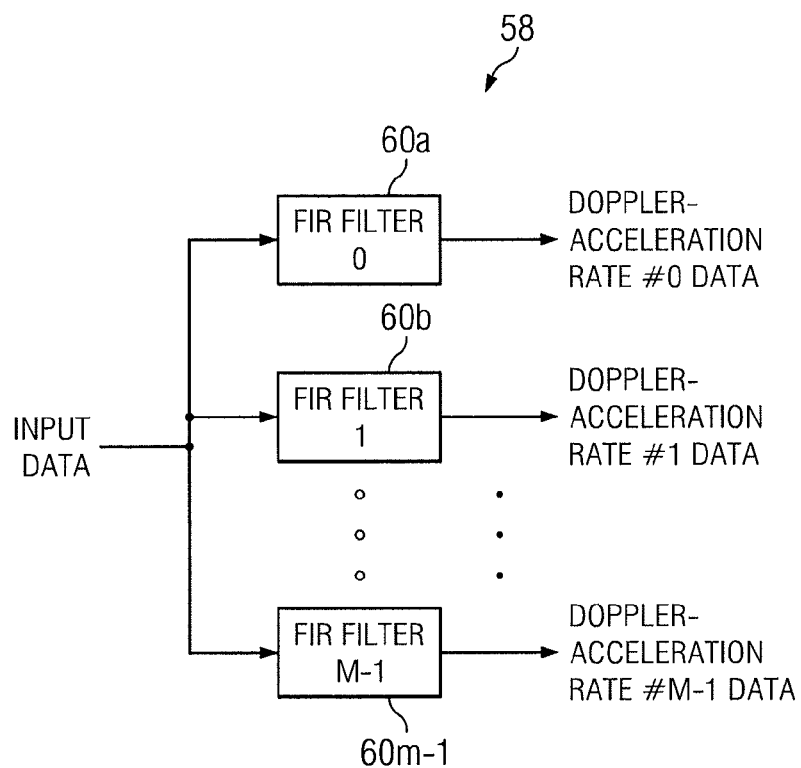
FIGS. 3A and 3B illustrate examples of Doppler-acceleration matched filter systems.

FIG. 3A illustrates an example of Doppler-acceleration matched filter system 58. In the example, Doppler-acceleration matched filter system 58 includes Doppler-acceleration matched filters such as one or more finite impulse response (FIR) filters 60 (60a-m). Each FIR filter 60 receives output from range matched filters 40 and provides output to sliding window integrator 43. In certain embodiments, a FIR filter 60 has coefficients associated with one or more combinations of Doppler shifts and accelerations. For example, a set of coefficients may be used to filter for a particular combination of Doppler shift and acceleration.

Figure 3B:
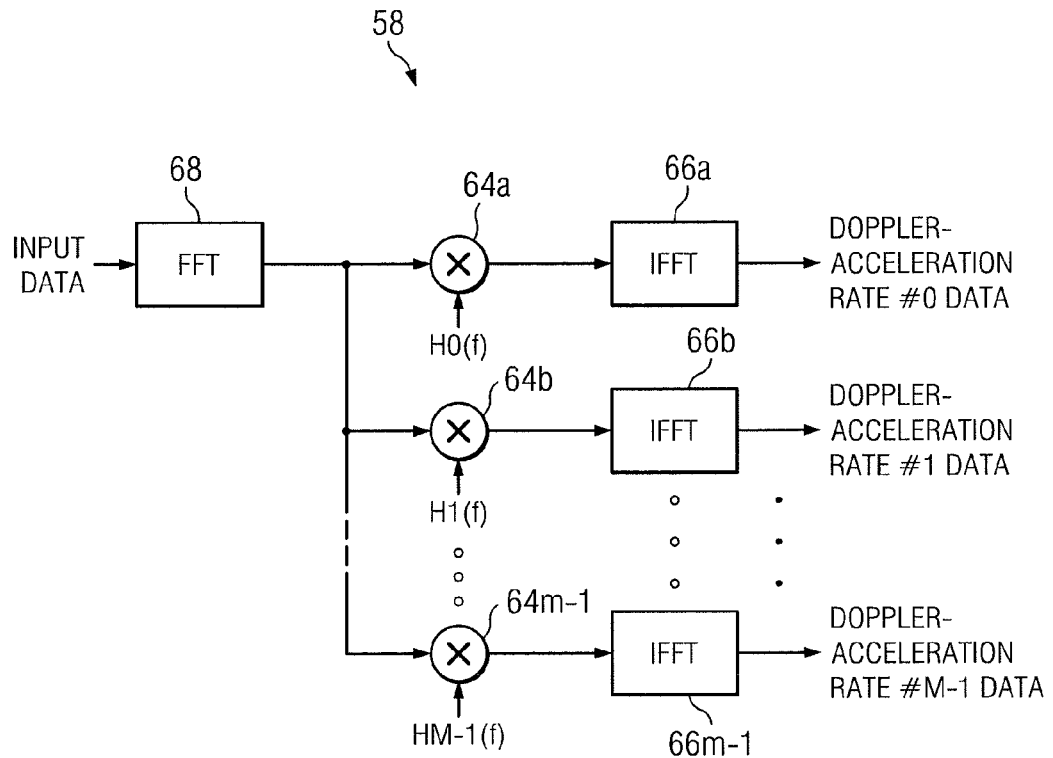

FIG. 3B illustrates another example of Doppler-acceleration matched filter system 58. In the example, Doppler-acceleration matched filter system 58 includes a fast Fourier transform (FFT) system 68, an array of multipliers 64 (64a-m), and a system of inverse fast Fourier transform (IFFT) filters 66 (66a-m) coupled as shown.

FFT system 68 receives output from range matched filters 40. Multipliers 64 receives output from FFT system 68 and filter coefficients Ha(f) through Hm(f), where each coefficient frequency is selected according to the position of the filter connected to the multiplier in the processing array. The different Hi(f) filter coefficients represent the frequency domain equivalent of the matched filter coefficients needed for the i(th) Doppler-acceleration filter. These coefficients are obtained by computing the fast Fourier transform of the coefficients h(i) for the FIR filters 50.

The output of each multiplier 64 is applied to an IFFT filter 66. Each IFFT filter 66 outputs Doppler-acceleration rate data varying with the position of IFFT filter 66 in the array. In this embodiment, only one FFT system 68 needs to be used because the filter coefficients H modify the data after conversion to the frequency domain.

Figure 4:
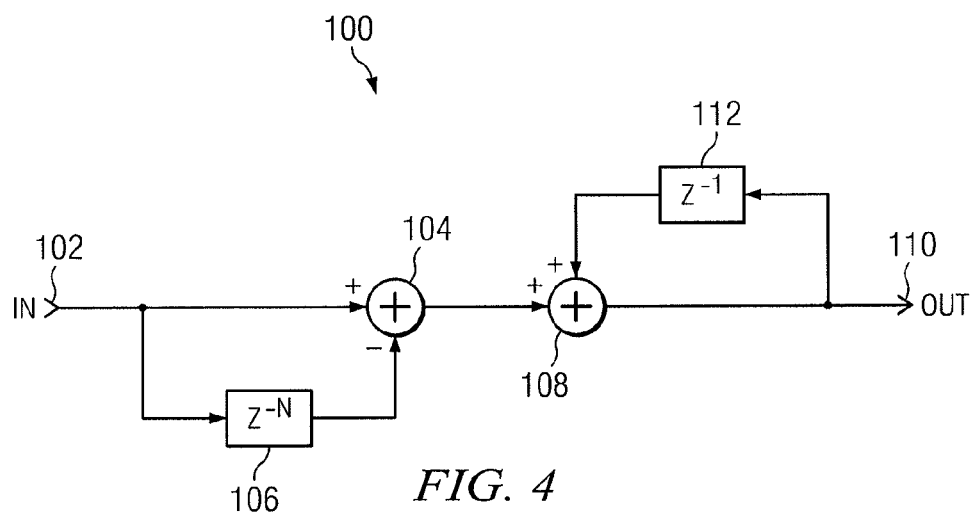
FIG. 4 illustrates an example of an equivalent filter for estimating the frequency response of a sliding window integrator.

FIG. 4 illustrates an example of an equivalent filter 100 for estimating the frequency response of sliding window integrator 43. Equivalent filter 100 includes an input port 102, a first summer 104, an N inter-pulse time period delay 106, a second summer 108, an output port 110, and a one inter-pulse time period delay 112 coupled as shown. Variable N represents the number of pulses of electromagnetic wave 24 that are reflected by an object at a fixed location in free space as the antenna beam of antenna 22 scans across the object. The value of N may change with change in the rate at which the antenna beam scans.

In certain embodiments, first summer 104 subtracts the output of delay 106 from the signal received at first input 102. Second summer 108 adds the output of delay 112 to the signal from first summer 104.

Figure 5:
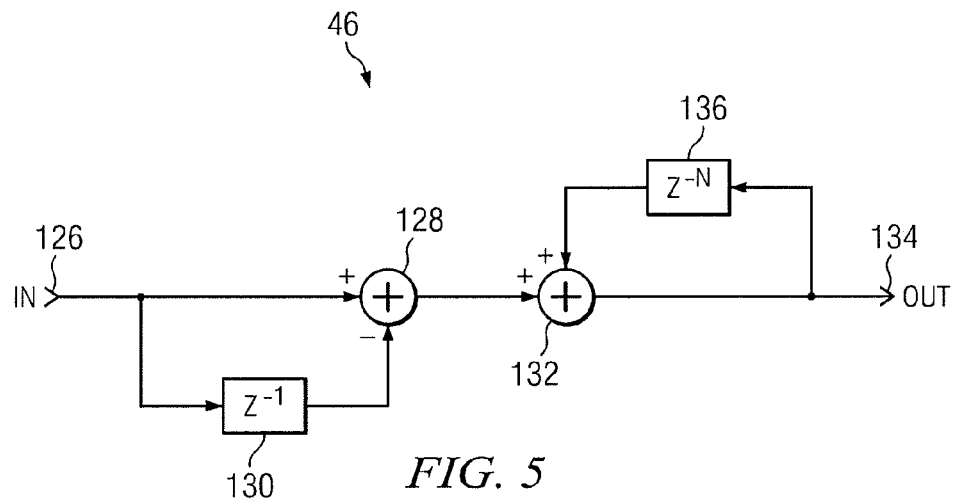
FIG. 5 illustrates an example of an inverse sliding window integrator filter.

FIG. 5 illustrates an example of inverse SWI filter 46. In the illustrated example, inverse SWI filter 46 includes an input port 126, a first summer 128, a one inter-pulse time period delay 130, a second summer 132, an output port 134, and an N inter-pulse time period delay 136 coupled as shown. First summer 128 subtracts the output of delay 130 from the signal received at first input 126. Second summer 132 adds the output of delay 136 to the signal from first summer 128.

In certain embodiments, the filtering function of inverse SWI filter 46 is derived from the frequency response of the sliding window integrator 43 as estimated from equivalent filter 100. The derivation presumes that convolution of the unit pulse response g(n) for the inverse filter with the unit pulse response h(n) of the non-inverse filter comprises a unit pulse (delta (n)), which may be expressed as:

$$\text{delta}(n) = h(n) + g(n)$$

where delta(n) is one at n=0, and zero for n>0.

In the illustrated example, the convolution of the unit pulse response of inverse SWI filter 46 with the unit pulse response of equivalent filter 100 comprises a unit pulse. To estimate the response of sliding window integrator 43, h(n)=1. Therefore, to satisfy the equation:

$$g(o) = 1$$

$$g(1) = -g(o) = -1$$

$$g(2) = -g(o) - g(1) = 0$$

$$g(3) = -g(0) - g(1) - g(2) = 0$$

As n increases, the result continues to be zero until g(N−1). After that point, the sequence repeats. Inverse SWI filter 46 in combination with the filtering effects of SWI 43 may yield a substantially unitary response to a radar return signal.

Figure 6:
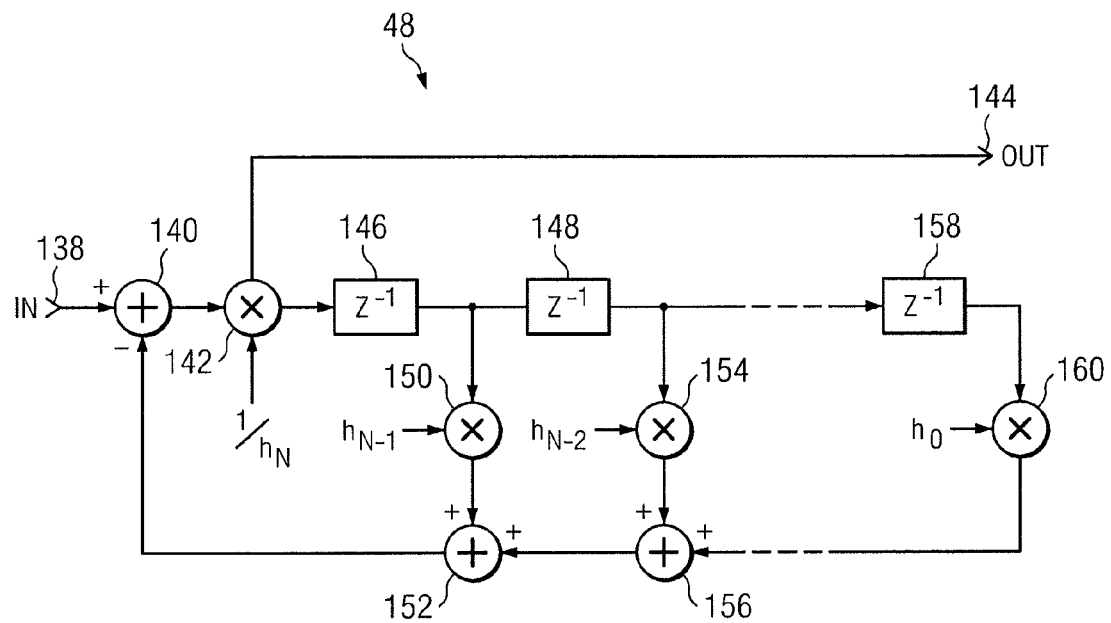
FIG. 6 illustrates an example of an inverse antenna gain filter.

FIG. 6 illustrates an example of inverse antenna gain filter 48. In the illustrated embodiment, inverse antenna gain filter 48 includes an input port 138, a summer 140, a multiplier 142, an output port 144, a one inter-pulse time period delay 146, a subsequent one inter-pulse time period delay 148, a multiplier 150, a summer 152, a multiplier 154, a summer 156, a one inter-pulse time period delay 158, and a multiplier 160 coupled as shown.

Multiplier 142 multiples by a coefficient $1/h_N$. Multiplier 150 multiples by a coefficient $h_{N-1}$. Multiplier 154 multiples by a coefficient $h_{N-2}$. Multiplier 160 multiples by a coefficient $h_0$. Summer 156 adds the outputs of multipliers 154 and 160. Summer 152 adds the outputs of multiplier 150 and summer 156. Summer 140 subtracts the output of summer 152 from input received at input port 138. Coefficients $h_0$ through $h_N$ are gain pattern coefficients of antenna 22 with reference to individual pulses N as the antenna beam scans across a fixed object. N has the same value as in equivalent filter 100.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable link and/or communication network. A link and/or communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, a wire, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:
   a plurality of range matched filters configured to:
      receive a plurality of radar return signals detected by an antenna; and
      range match filter the radar return signals to place the radar return signals into a plurality of range cells, where the plurality of range cells are the size of a target plus a target range motion during an integration time, the target being an object of interest associated with at least one of the plurality of radar return signals;
   a Doppler-acceleration matched filter system configured to Doppler-acceleration process the radar return signals in the range cells to facilitate identification of one or more targets;
   a sliding window integrator (SWI) configured to improve a monopulse-based azimuth angle accuracy, which is based on a signal-to-noise ratio of a single radar return pulse of the plurality of radar return signals, by integrating the radar return signals;
   an inverse filter system configured to perform azimuth processing by azimuth match filtering the radar return signals to divide the radar return data into azimuth cells, wherein each azimuth cell represents a slice of an azimuth bandwidth of the radar return signals; and
   an adaptive threshold device configured to determine a strength of the radar return signals and subject the radar return signals to a threshold criteria to identify one or more targets.

2. The apparatus of claim 1, the Doppler-acceleration matched filter system configured to:
   Doppler-acceleration matched filter for a combination of a Doppler shift and an acceleration.

3. The apparatus of claim 1, the Doppler-acceleration matched filter system configured to:
   Doppler-acceleration matched filter the radar return signals using one or more filters with one or more coefficients associated with one or more combinations of Doppler shifts and accelerations.

4. The apparatus of claim 1, the Doppler-acceleration matched filter system configured to Doppler-acceleration process the radar return signals before the inverse filter system azimuth match filters the radar return signals.

5. The apparatus of claim 1, the inverse filter system comprising:
   a first inverse filter configured to inverse filter the radar return signals, the first inverse filter having a filter response that is substantially an inverse of an azimuth beam gain of the antenna.

6. The apparatus of claim 5, the inverse filter system comprising:
   a second inverse filter configured to inverse filter the radar return signals, the second inverse filter having an inverse filter response that is substantially an inverse of a filter response for a sliding window integrator.

7. The apparatus of claim 5, the inverse filter system comprising:
   a second inverse filter configured to inverse filter the radar return signals, the second inverse filter having an inverse filter response that is substantially an inverse of a filter response for a sliding window integrator, the inverse filter response derived from an assumption that an inverse unit pulse response convoluted with a unit pulse response yields a unit pulse.

8. The apparatus of claim 1, the inverse filter system configured to azimuth match filter the radar return signals before the adaptive threshold device adaptively thresholds the filtered radar return signals.

9. A method comprising:
   receiving a plurality of radar return signals detected by an antenna;
   range match filtering the radar return signals to place the radar return signals into a plurality of range cells, where the plurality of range cells are the size of a target plus a target range motion during an integration time, the target being an object of interest associated with at least one of the plurality of radar return signals;
   Doppler-acceleration processing the radar return signals in the range cells to facilitate identification of one or more targets;
   integrating the radar return signals to improve a signal-to-noise ratio of the radar return signals;
   azimuth match filtering the radar return signals to divide the radar return data into azimuth cells, wherein each azimuth cell represents a slice of an azimuth bandwidth of the radar return signals; and
   determining a strength of the radar return signals and subject the radar return signals to a threshold criteria to identify one or more targets.

10. The method of claim 9, the Doppler-acceleration processing the radar return signals comprising:
    Doppler-acceleration matched filtering for a combination of a Doppler shift and an acceleration.

11. The method of claim 9, the Doppler-acceleration processing the radar return signals comprising:
    Doppler-acceleration matched filtering the radar return signals using an array of filters with one or more coefficients associated with one or more combinations of Doppler shifts and accelerations.

12. The method of claim 9, further comprising:
    Doppler-acceleration processing the radar return signals before azimuth match filtering the radar return signals.

13. The method of claim 9, the azimuth match filtering the radar return signals comprising:
    inverse filtering the radar return signals at a first inverse filter having a filter response that is substantially an inverse of an azimuth beam gain of the antenna.

14. The method of claim 13, the azimuth match filtering the radar return signals comprising:

inverse filtering the radar return signals at a second inverse filter having an inverse filter response that is substantially an inverse of a filter response for a sliding window integrator.

15. The method of claim 13, the azimuth match filtering the radar return signals comprising:

inverse filtering the radar return signals at a second inverse filter having an inverse filter response that is substantially an inverse of a filter response for a sliding window integrator, the inverse filter response derived from an assumption that an inverse unit pulse response convoluted with a unit pulse response yields a unit pulse.

16. The method of claim 9, further comprising:

azimuth match filtering the radar return signals before adaptive thresholding the filtered radar return signals.

* * * * *